Oct. 17, 1967   A. W. KEMP   3,347,157
ROLL STRUCTURES AND METHOD
Filed April 30, 1965   3 Sheets-Sheet 1

INVENTOR
Arthur W. Kemp
BY
DeLio and Montgomery
ATTORNEYS

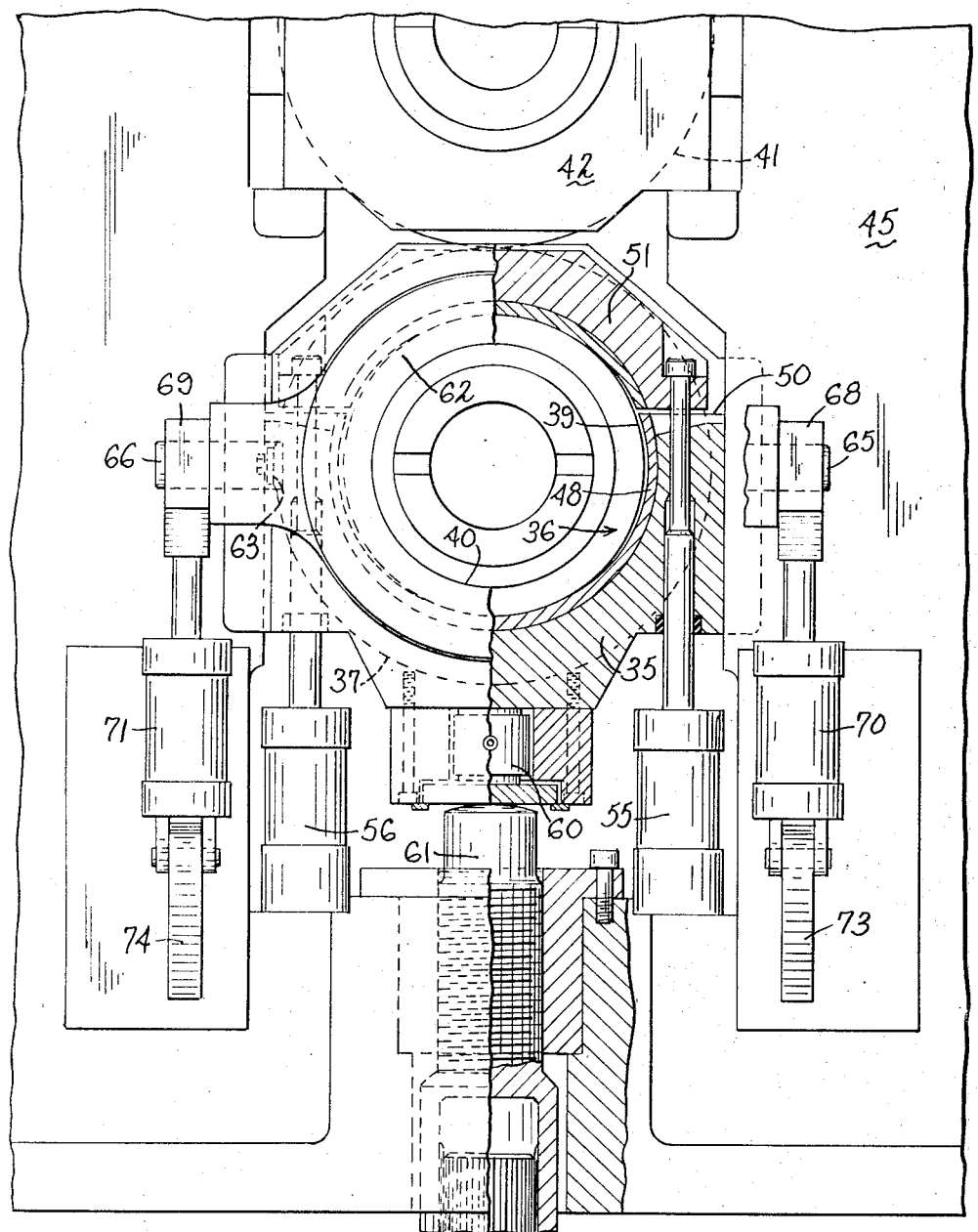

Oct. 17, 1967  A. W. KEMP  3,347,157
ROLL STRUCTURES AND METHOD
Filed April 30, 1965  3 Sheets-Sheet 3

INVENTOR
Arthur W. Kemp
BY
DeLio and Montgomery
ATTORNEYS 3,347,157
ROLL STRUCTURES AND METHOD
Arthur W. Kemp, Woodbridge, Conn., assignor to Farrel Corporation, Ansonia, Conn., a corporation of Connecticut
Filed Apr. 30, 1965, Ser. No. 452,263
7 Claims. (Cl. 100—41)

ABSTRACT OF THE DISCLOSURE

A system and method for insuring the stability of a roll within its supporting bearings when the roll is raised from its supporting bearings in order to produce a crown in the roll. The invention is further directed to a new and novel bearing assembly having a bottom portion and a movable top portion, wherein the movable top portion may be pulled downwardly to seat a roll journal properly within the lower portion of the bearing.

This invention relates to roll structures and more particularly to a new and improved method and means for stabilizing a roll within its main bearings.

The instant invention is of utility in various arts. However, it is particularly useful in the paper, rubber and plastic arts, wherein material is passed through a plurality of calender rolls to form precisely gaged sheets. In recent years, various improvements have been made to the rolls in order to provide sheets of material having a substantially uniform thickness transversely. In particular, the prior art has taught the use of controllable pressure and auxiliary bearing means in association with the roll journals of the rolls for applying pressure to a pair of rolls to camber or bend the longitudinal axes thereof in controllable amounts so that the cooperating work surfaces of the rolls can be positioned closer together near their centers to increase the crown or bring the roll ends closer together to decrease the crown.

To reduce the crown of the bottom supporting roll of a two-high or other roll grouping, the force (unbending) exerted by the outer auxiliary bearing acts to subtract some of the load from the main roll bearings. If the force is great enough, it could act to remove the load from the main bearings and cause an unstable condition. If the force removes the roll journal load from the main bearing, then the roll journal within the main bearing would become unstable within the bearing clearance. If the unbending force is sufficient, the roll journal could be moved from its normal pressure contact area of the bearing to a bearing area position approximately 180° opposite. This instability (mentioned above) is traceable to the fact that plain bearings or roller bearings require a certain amount of clearance for operation and any shifting of the position of the roll journal from one side to another in the main bearing would be detrimental to the operation of the rolls and the shape of the material formed by the rolls.

Accordingly, it is an object of this invention to provide a new and improved method and means for compensating for roll instability.

Another object of this invention is to provide a new and improved means to selectively compensate for the effect of the bending of a roll on the position of the roll journals with respect to the main bearings of the roll.

Another object of this invention is to provide a new and improved means for sensing the position of roll journals with respect to the interior of said roll bearings.

A further object of this invention is to provide a new and improved bearing means for maintaining roll journal stability.

Still other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 3 is an end view of FIG. 2, partially in section in accordance with this invention;

Figure 1:
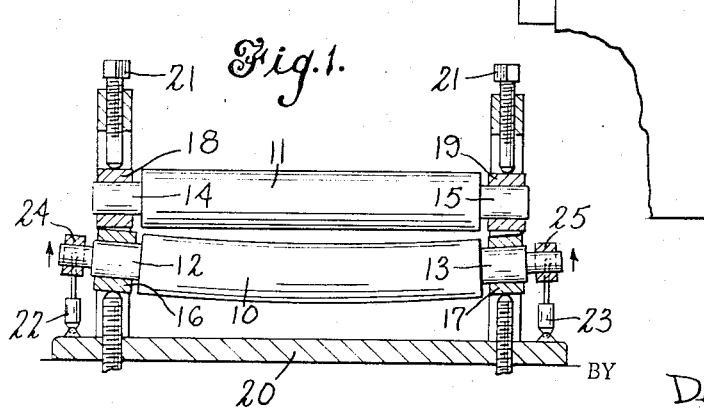
FIG. 1 is a diagrammatic illustration in vertical section of a two-high set of rolls illustrating (in exaggerated form) the manner in which one of a pair of rolls can be cambered away from the other at its center.

Referring to FIG. 1, there is shown a diagrammatic illustration of a pair of rolls 10 and 11, positioned in a two-high fashion. The roll 10 includes journals 12 and 13, while the roll 11 includes journals 14 and 15. The journals 12 and 13 are supported in journal box main bearings 16 and 17, while the journals 14 and 15 are supported in journal box main bearings 18 and 19, respectively. All of the main bearings are supported and positioned in a frame 20 by a plurality of bearing position adjustable screw means 21.

Normally, the rolls 10 and 11 are positioned in a manner such that they are the same distance apart along their entire axes. Often during the rolling of material, it is required that the center of the rolls be positioned further apart. To accomplish this, the roll 10 is cambered or bent about two fulcrum points provided by frame 20 by the addition of two frame-mounted hydraulic cylinders 22 and 23 coupled to auxiliary bearings 24 and 25 positioned on the journals 12 and 13 adjacent to the main bearings 16 and 17. By forcing fluid into the cylinders 22 and 23 the auxiliary bearings are raised, thus bending the roll 10 as shown in an exaggerated form in FIG. 1. This form of roll bending is commonly referred to as reducing the crown of the roll, as contrasted with the more common method of increasing the crown of the roll by bending the roll at its center in an opposite direction. In this form of bending, when the auxiliary or outboard bearings 24 and 25 act to decrease the crown, any force exerted by the outer bending bearings acts to raise journals 12 and 13, thus directly subtracting some of the load on the main bearings 16 and 17. If the force is sufficiently great, it could act to remove load from the main bearings 16 and 17 which would lead to an unstable condition within the main bearing. If the outer bending force removes load from the main bearings, then roll journals 12 and 13 within the main bearing would become unstable within the bearing clearance and if the unbending force is great enough, the journals would be so positioned within their bearings that the principal journal load would be supported by the top of the main bearing instead of the bottom of the main bearing. This shifting of the position of the main roll journals from one side to another in the main bearings would be detrimental to the proper operation of a calender or rolling machine.

Figure 2:
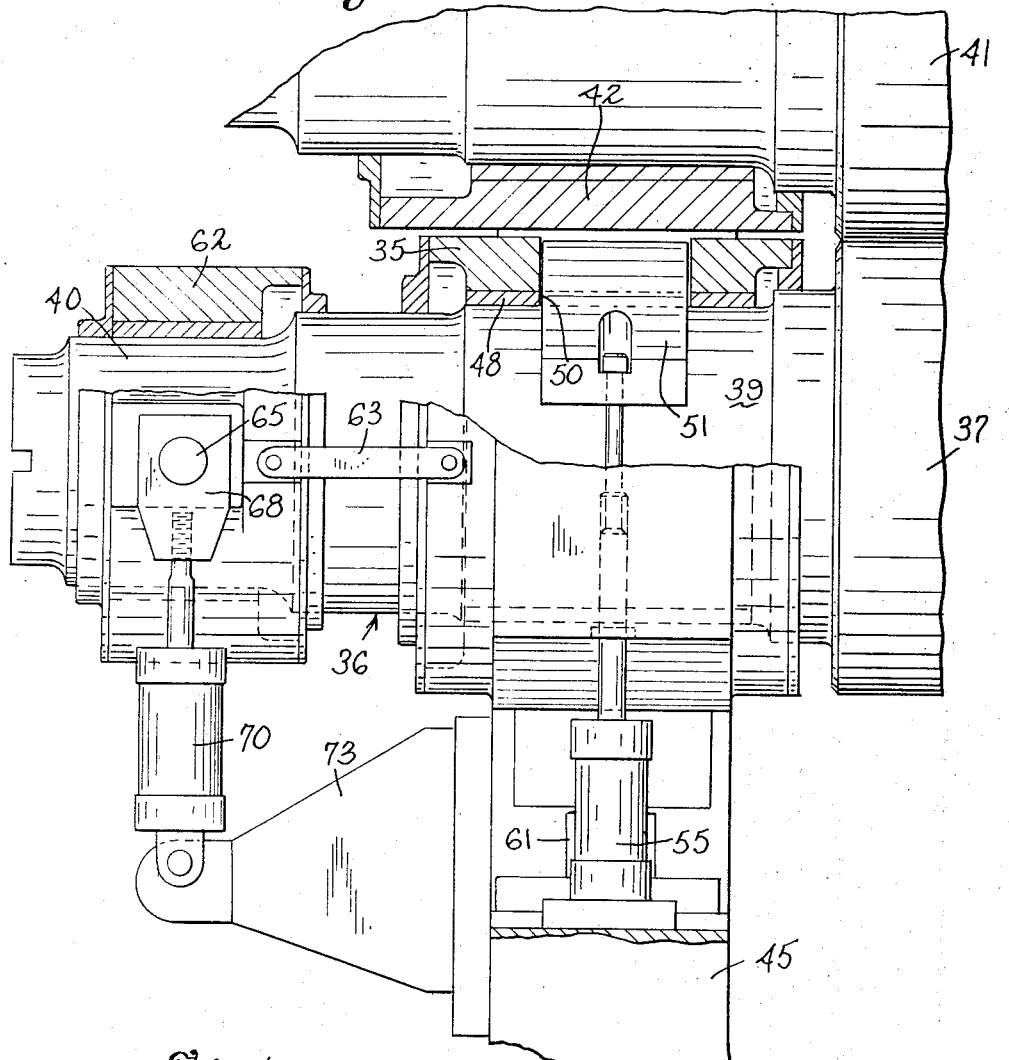
FIG. 2 is a side elevational view partially in section of a roll main bearing means, means for bending a roll, and means for compensating for an instability of the roll in the bearing means in accordance with this invention.

In order to insure the stability of machine operation, this invention has incorporated new features of construction and a new method of operation. These new features of construction are better shown by reference to FIGS. 2 and 3, wherein there is disclosed a roll journal box and main bearing assembly 35 for stabilizing a roll journal 36 within its main bearing. The roll journal 36 forms a part of a first roll 37 and includes two smaller diameter sections 39 and 40. Positioned above and cooperating with the roll 37 is a second roll 41 which is supported in its own journal box 42 in a manner well known in the art. A frame 45 is shown for supporting the journal boxes 35 and 42 to position the rolls 37 and 41 in a two-high fashion. It is to be understood that this invention is not limited to a two-high rolling machine, other configuration rolling machines could equally gain by the utilization of this invention.

The journal box 35 includes a first bearing section 48 which surrounds the journal section 39. The bearing section could be a sleeve or roller type bearing or any variation thereof. The bearing section 48 is provided with a top cut-out portion generally shown at 50. Positioned in the cut-out portion 50 is a second bearing section 51 which mates with the first bearing section 48 and is slidably mounted therein. The second bearing section 51 is coupled to two frame-mounted hydraulic cylinders 55 and 56 for drawing it down against the roll journal section 39, thereby properly seating the section 39 in the bottom of the first bearing section 48. In order to determine the position and seating of the roll journal section 39 in the bearing section 48, there is preferably provided in frame 45 a load cell means 60 which physically abuts the bottom of the main bearing section 48. It is mounted in position by an adjustable screw means 61 mounted in the frame 45. The amount of pressure transmitted and/or detected by the load cell means is a measure of the weight supported by the bottom of the bearing. This information can then be utilized to determine the proper time to actuate the hydraulic cylinders 55 and 56 to bring the bearing section 51 down against the roll journal 36.

Positioned adjacent to journal box 35 and mounted on the journal section 40 is an auxiliary or outboard bearing means 62. The outboard bearing means is coupled by way of straps 63 to the journal box 35. Additionally, the outboard bearing means 62 has mounted thereon a pair of trunnions 65 and 66 upon which there is pivotally mounted a pair of blocks 68 and 69, respectively. Coupled to the blocks 68 and 69 is a pair of preferably hydraulic cylinders 70 and 71, respectively. Each of the cylinders are pivotally coupled to separate frame-supported flanges 73 and 74, respectively. By controllably actuating the cylinders 70 and 71, it is possible to bend roll 37 to reduce its crown about the fulcrum provided by frame 45. Thus, if the force provided to the journal 36 by cylinders 70 and 71 is sufficiently great to reduce the load on the bottom of bearing section 48 by a predetermined amount, cylinders 55 and 56 are then actuated to cause the bearing section 51 to bear down on the journal 36 to prevent instability in the bearing. Although the preferred embodiment shows that the journal pressure is detected by a load cell sensor means, it is to be understood that a sensor means need not be utilized inasmuch as the cylinders 55 and 56 may be actuated as a consequence of empirically determining the counteracting force required to stabilize the journal within its bearings. This empirical calculation may be based upon knowing the separating forces created by the various materials being calendared and the amount of force applied to bend the roll.

It is additionally to be understood that the principles of this invention are equally applicable to the top roll of this calender or to different positioned rolls of multi-roll calender machines in general. The mode of driving the rolls is not shown herein and forms no part of this invention inasmuch as the means for so doing are well known in the art.

Figure 4:
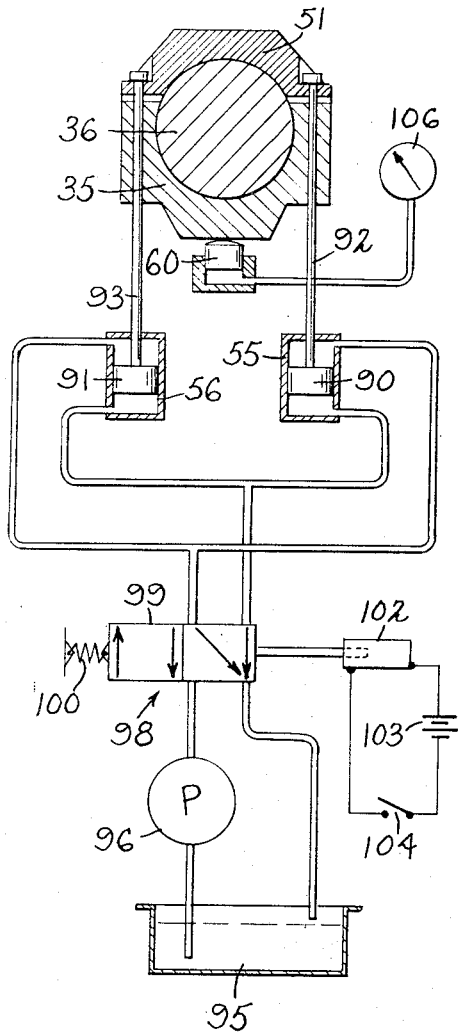
FIG. 4 is a diagrammatic illustration of control and sensing apparatus associated with the means for compensating for roll instability in accordance with this invention.

Referring now to FIG. 4, there is disclosed control apparatus for moving cylinders 55 and 56 due to the sensing of the pressure produced at the bottom of the bearing section 48 as a result of the load on the roll 37. Shown in this figure are the two hydraulic cylinders 55 and 56 which include pistons 90 and 91, respectively, and piston rods 92 and 93, respectively. The piston rods 92 and 93 are coupled to the movable bearing section 51 in a manner adapted to force the journal 36 to seat properly in the bearing 48. To provide hydraulic fluid to control the cylinder pistons 90 and 91, a conventional hydraulic fluid reservoir 95 is provided which is coupled via conduits, to a pump means 96, which could also include a motor and a precharger. Positioned intermediate reservoir 95 and cylinders 55 and 56 is a hydraulic control valve 98. The valve 98 includes a magnetic material spool 99 which is resiliently biased toward the left of the valve by a spring 100. The valve also includes a solenoid 102 which, when actuated, attracts and moves the spool toward the right of the valve. In order to actuate the valve solenoid 102, there is provided a battery 103 and a switch 104. Additionally in this figure, the load cell 60 is shown coupled to a pressure gage 106 which indicates the load of the journal on the bottom of the bearing.

Thus, to cause the bearing section 51 to move in a downward direction, the valve solenoid 102 is energized by the closure of the switch 104. This moves spool 99 to a position such that hydraulic fluid will enter the top of cylinders 55 and 56 while, at the same time, the bottom of the cylinder will be coupled to permit hydraulic fluid to exit therefrom. Upon opening of the switch 104, the spool 99 will be repositioned due to the spring 100, such that the cylinders 55 and 56 will be bled to the reservoir 95.

Figure 5:
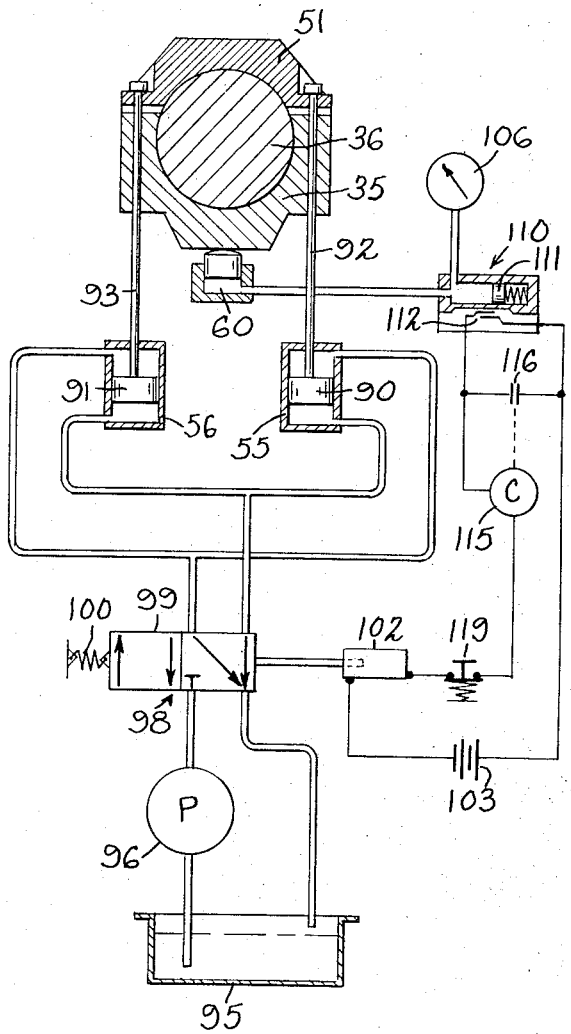
FIG. 5 is a diagrammatic illustration of control and sensing apparatus for automatically compensating for roll journal instability in accordance with this invention.

Referring now to FIG. 5, there is disclosed a control system which automatically positions the bearing section 51 as a result of a sensed bearing load pressure. In this figure, corresponding devices are numbered the same as those shown in FIG. 4. There is also included in this figure a pressure sensitive hydraulic switch which could be of the type utilized in automobile systems or, preferably, the type utilizing a movable magnetic cylinder which actuates a magnetic responsive reed element. This type of switch is shown at 110 in this figure and includes a spring-biased permanent magnetic cylinder 111 which is positioned in accordance with fluid pressure applied to one side thereof. Positioned in the switch is a reed element 112 which closes when cylinder 111 is in proximity thereto. The closure of switch element 112 energizes the solenoid 102 to position spool 99 in a manner to cause the bearing section to move downward. Since the cylinder 111 selectively closes switch element 112 in accordance with a sensed force detected by the load cell, the bearing section will be selectively moved whenever the force applied to reduce the crown on the roll is sufficient to cause instability of the roll journal in the main bearing. In order to hold the bearing section 51 in a downward direction, a holding circuit comprising a relay coil 115 and a normally open relay contact 116 are provided. Upon closure of switch element 112, the coil 115 is energized, thereby closing contact 116 and thus maintaining the bearing section 51 forcibly in contact with journal 36. To release the hydraulic cylinder actuating circuit, a spring-loaded switch 119 is provided.

It is to be understood that for the purposes of this invention, other types of sensors, such as strain transducers of the piezo-electric or semi-conductor type, could be utilized in place of the load cell sensor means, although the load cell is preferred.

It will thus be seen that the objects set forth above, among those made apparent from the preceding description, are efficiently attained and since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In combination, a roll, journals on the ends of the roll, bearing means mounted about said journal for supporting said journals, each of said bearing means including at least first and second bearing sections in which said journals are mounted, means engaging one of the bearing sections of each of the bearing means to retain a portion thereof against movement in a direction normal to the longitudinal axis of said roll, means coupled to said journals for bending said roll, means for sensing the position of at least one of said journals in said bearing means, and means selectively actuated as a result of a signal provided by said means for sensing and coupled to at least one of said bearing section means to selectively compensate for an unstable position of at least one of said journals in said bearing means.

2. In combination, a plurality of cooperating rolls in a vertical stack adapted to form a nip between the rolls, journals on the ends of at least the bottom rolls, a first set of bearing means in which said journals are mounted, a second set of bearing means positioned axially outward and adjacent to said first set of bearings, means for retaining a portion of said first bearing means in a relatively fixed position normal to the longitudinal axis of the roll, means engaging said second set of bearing means and urging them upwardly to impart a camber to the longitudinal axis of said bottom roll, and means forming a second portion of said first set of bearing means for engaging the upper surface of said journals to selectively stabilize said journals, and load cell means to indicate instability of said journals in said first bearing means.

3. In combination, a roll, journals on the ends of the roll, bearing means on each of said journals to support said journals, each of said bearing means including a first lower bearing portion having an upper cutout region therein, said journals normally being supported by said lower bearing portion and a second upper bearing portion which is vertically slidable in said first portion and which mates with said first portion to form at least a portion of said bearing means, sensor means providing an indication of the seating of said journals in said first lower bearing portion, and means coupled to the second upper bearing portion to move it in a downward direction to again precisely seat said journal in the bottom portion of said first bearing portion.

4. A combination in accordance with claim 3, wherein said means coupled to the second upper bearing section includes hydraulic means to forcibly move said second upper bearing section.

5. A combination in accordance with claim 3, including fixed fulcrum means engaging said first lower bearing section and wherein each of said journals have coupled thereto auxiliary bearings and wherein each of said auxiliary bearings have coupled thereto means for imparting a crown to said roll.

6. A combination in accordance with claim 5, wherein said sensor means is a load cell which engages the first bottom bearing section.

7. The method of forming sheet material to a desired gauge in a roller press having a plurality of cooperating rolls in a vertical stack, said rolls having their journals supported in bearing means, comprising the steps of rolling the sheet material between said plurality of rolls, raising the journals of one of said rolls to a distance axially spaced from said bearing means to bend the surface of the roll into an arcuate shape, detecting the seating of the journal of the roll being bent in the bearing means to determine if the journal is unstable within its supporting bearing means, and then forcing the journal of the roll being bent downwardly into the bearing means to stabilize the roll in the bearing means.

References Cited

UNITED STATES PATENTS

| 802,777 | 10/1905 | Nutt. | |
|---|---|---|---|
| 1,555,632 | 9/1925 | Brown. | |
| 2,367,613 | 1/1945 | Rich et al. | |
| 2,604,366 | 7/1952 | Morgan et al. | |
| 2,611,150 | 9/1952 | Goulding | 18—2 |
| 2,703,735 | 3/1955 | Falk et al. | 308—26 |
| 2,825,217 | 3/1958 | Byrd | 68—256 |
| 2,897,538 | 8/1959 | Shapiro et al. | 18—2 |
| 2,992,866 | 7/1961 | Cavalieri | 308—59 |
| 3,060,843 | 10/1962 | Moore et al. | 100—41 |
| 3,085,503 | 4/1963 | Moore | 100—90 |
| 3,157,073 | 11/1964 | Blain | 100—170 X |
| 3,171,305 | 3/1965 | Stone | 100—170 X |

FOREIGN PATENTS

| 747,347 | 4/1956 | Great Britain. |
|---|---|---|

LOUIS O. MAASSEL, *Primary Examiner.*